United States Patent [19]

Komaransky et al.

[11] Patent Number: 4,839,210

[45] Date of Patent: Jun. 13, 1989

[54] METHOD AND MECHANISM FOR PRODUCING CUSHIONING DUNNAGE PRODUCT

[75] Inventors: Anthony J. Komaransky, Mentor; Raymond Q. Armington, Willoughby, both of Ohio

[73] Assignee: Ranpak Corp., Willoughby, Ohio

[21] Appl. No.: 80,544

[22] Filed: Jul. 31, 1987

Related U.S. Application Data

[62] Division of Ser. No. 792,313, Dec. 28, 1985, Pat. No. 4,750,896.

[51] Int. Cl.[4] .......... B32B 7/02

[52] U.S. Cl. .......... 428/77; 428/906; 428/213; 242/1; 206/412

[58] Field of Search .......... 428/906, 213, 77; 206/412, 389; 242/1

[56] References Cited

U.S. PATENT DOCUMENTS

| | | | |
|---|---|---|---|
| 3,509,797 | 5/1970 | Johnson | 93/1 |
| 3,509,798 | 5/1970 | Johnson | 93/1 |
| 3,603,216 | 9/1971 | Johnson | 93/1 |
| 3,655,500 | 4/1972 | Johnson | 161/104 |
| 3,799,039 | 3/1974 | Johnson | 93/1 |
| 4,026,198 | 5/1977 | Ottaviano | 93/1 |
| 4,085,662 | 4/1978 | Ottaviano | 93/1 |
| 4,109,040 | 8/1978 | Ottaviano | 928/129 |
| 4,237,776 | 12/1980 | Ottaviano | 493/82 |
| 4,258,846 | 3/1981 | Campo | 428/906 X |
| 4,557,716 | 12/1985 | Ottaviano | 493/464 |
| 4,650,456 | 3/1987 | Armington | 493/464 |

*Primary Examiner*—Alexander S. Thomas
*Attorney, Agent, or Firm*—Baldwin, Egan & Fetzer

[57] ABSTRACT

A mechanism and method for producing relatively low density pad-like cushioning dunnage product from sheet-like stock material. The mechanism takes the sheet-like stock material from a multi-ply roll thereof and changes it into a pad-like cushioning dunnage product having lateral pillow-like portions connected together along the generally central portion of the product. The mechanism includes a converging member which in conjunction with a forming frame coacting with the converging member, causes inward rolling of the lateral edges of the stock material into generally rolled form which is then adapted to be received in a connector operable to connect the rolled edge stock material forming the pillow-like portions, into the pad-like cushioning dunnage product.

A novel separating mechanism for separating the sheets of stock material as they move from the stock roll toward the forming frame and the converging member is provided, together with a transversely extending roller disposed ahead of the separating mechanism whereby the point of commencement of entry of the multi-ply sheet-like stock material toward the separating mechanism remains constant irrespective of the diameter of the stock roll.

A novel alternate, multi-ply stock roll comprising a thicker gauge but lesser width web with a plurality of wider webs or sheets is also provided.

The idea is to generally improve the construction of the dunnage producing mechanism, and to improve its operation as well as to provide a pad-like dunnage product possessing substantial resiliency per unit volume, and which is securely attached along the abutting rolled edges of the pillow-like portions of the produced cushioning product, so that the pad-like material tends to more positively remain in pad-like form during its use as a packing.

5 Claims, 5 Drawing Sheets

Fig 1
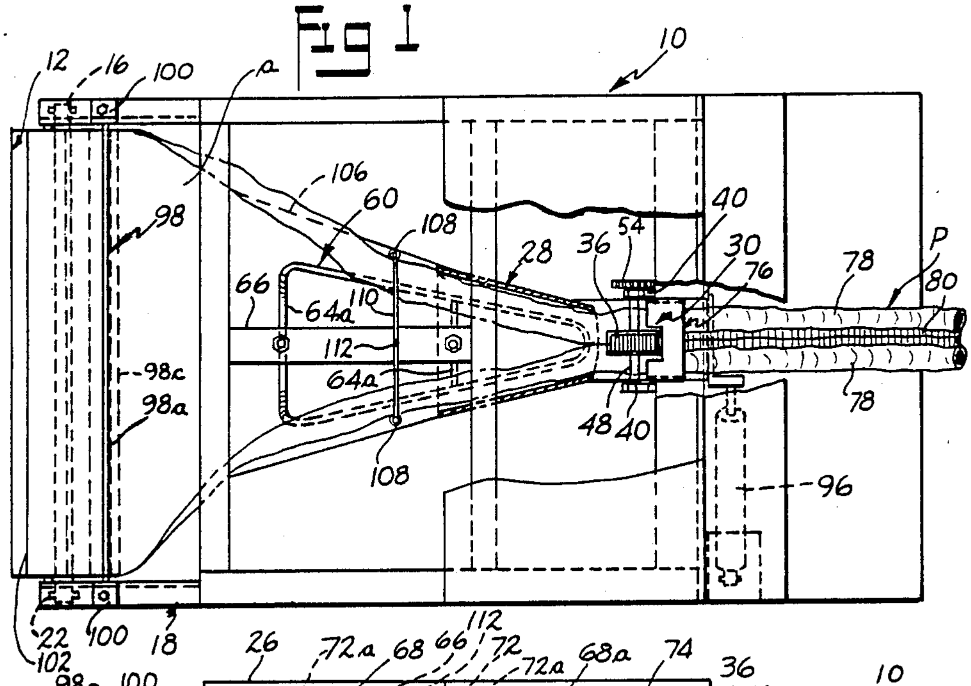
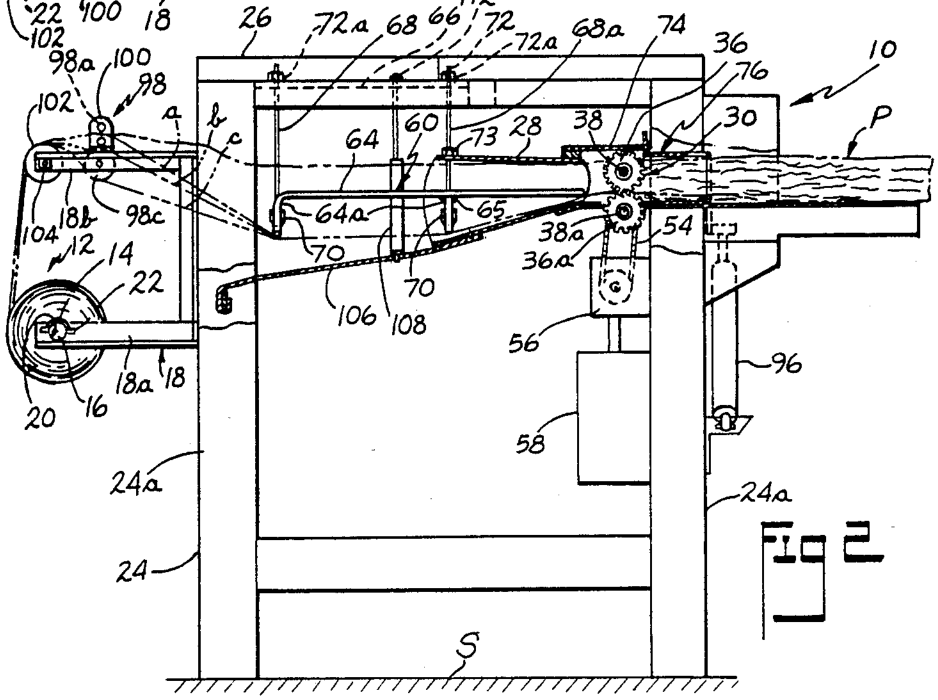
Fig 2

Fig 14
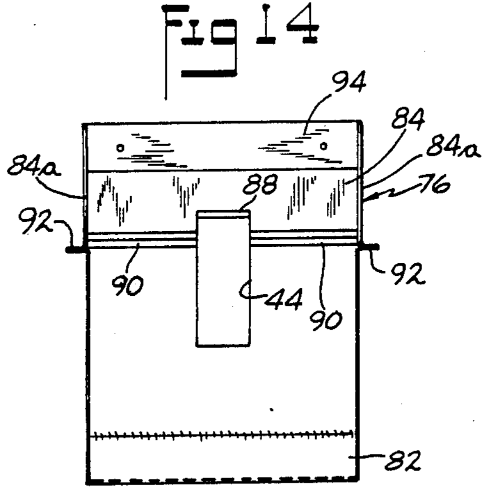
Fig 15
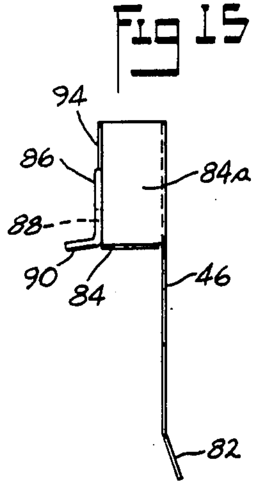
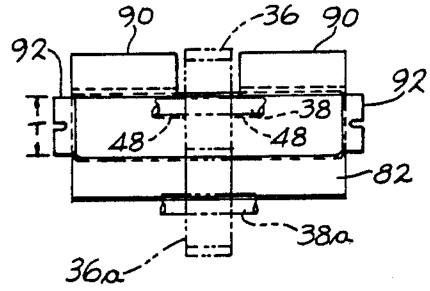
Fig 16
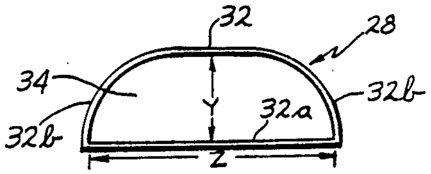
Fig 13

METHOD AND MECHANISM FOR PRODUCING CUSHIONING DUNNAGE PRODUCT

This is a division of application Ser. No. 792,313, filed Oct. 28, 1985 U.S. Pat. No. 4,750,8960.

This invention relates generally to mechanism and method for producing packaging material or cushioning dunnage as it is known in the art, and more particularly to a dunnage producing mechanism or machine and method, operable to produce from sheet-like stock material, such as paper, a continuous strip of resilient pad-like or pad-shaped dunnage product of relatively light weight per unit volume. The mechanism includes a novel arrangement of converging member and coacting forming frame for urging the multi-ply stock material into formed lateral pillow-like or pillow-shaped portions of the dunnage product, and a mechanism and method wherein the lateral pillow-like or pillow-shaped portions of the formed pad-like dunnage product are more securely coined or adhered together, so that in use the pillow-like portions of the product tend to not generally unfold or become disconnected, thus improving the use of the pad as packing.

A novel separating mechanism is also provided on the dunnage producing machine for initially causing separation of the sheets of stock material as they are emitted off the stock roll prior to the stock material being received in the converging member. A novel alternate multi-ply stock roll for use in connection with the mechanism is also disclosed.

BACKGROUND OF THE INVENTION

Dunnage producing mechanism for producing a resilient pad-like cushioning dunnage product having lateral pillow-like portions and centrally connected as by coining and/or adhesive means is known in the art. U.S. Pat. No. 4,026,198 to Gary W. Ottaviano, dated May 31, 1977 and entitled Cushioning Dunnage Mechanism, Transfer Cart Therefor and Method, discloses a cushioning dunnage producing mechanism of the general type as that to which the present invention is directed and which includes a triangular shape, in plan, forming frame coacting with a lengthwise extending chute, for forming the sheets of stock material into rolled configuration prior to their passing into and through rotatable connecting gears which coin the rolled stock material and produce a pad-like dunnage product having laterally arranged and centrally connected pillow-like portions.

There are many other prior art patents disclosing dunnage producing mechanism and methods for producing a resilient pad-like cushioning dunnage product of the general type of the present product.

U.S. Pat. No. 3,655,500 dated Apr. 11, 1972 to G. R. Johnson and entitled A Resilient Cushioning Dunnage Product For Use In Packaging and Packing and U S. Pat. No. 4,109,040 dated Aug. 22, 1978 to Gary W. Ottaviano and entitled Cushioning Dunnage Product Produced From Cushioning Dunnage Mechanism, disclose various known resilient pad-like dunnage products comprising lateral resilient pillow-like portions connected along the central portion of the pad lengthwise thereof, together with methods and apparatus for producing same.

However, the prior art converter mechanisms do not generally produce the quality of securely connected pad-like dunnage product of the present arrangement, nor are such prior art dunnage producing mechanisms as expeditiously operable and internally accessible as that of the present arrangement.

SUMMARY OF THE INVENTION

The present invention provides a novel dunnage producing mechanism and method for producing from sheet-like stock material, such as for instance paper, a relatively lightweight pad-like or pad-shaped cushioning dunnage product comprising lateral pillow-like or pillow-shaped portions, and one that is more securely connected along its central portion, thereby enhancing use of the product as packing and cushioning material, with materially lesser chance of the lateral pillow-like portions of the cushioning product becoming disconnected from one another. The mechanism or machine of the present arrangement is of a somewhat similar type as that disclosed in the aforementioned prior U.S. Pat. No. 4,026,198 except that the mechanism is of somewhat simplified and more readily accessible nature for expediting repair thereof, as well as being more expeditiously operable, as will be hereinafter discussed in detail. The mechanism includes a converging member and a coacting forming frame extending rearwardly out the entrance end of the converging member, and which is operative to expeditiously direct the sheet-like stock material from the roll of stock into generally rolled edge form prior to the produced pillow-like portions being connected along the abutting rolled edges thereof, and with such connection being produced comparatively more securely, so as to form a more stable and thus more easily handled pad-like cushioning dunnage product.

Accordingly, an object of the invention is to provide an improved converter mechanism for producing cushioning dunnage for use as packing material and the like.

Another object of the invention is to provide a mechanism of the latter type which utilizes a plurality of webs or sheets of stock material, such as paper, and form such webs or sheets into a pad-like cushioning dunnage product possessing lateral pillow-like portions and a central connecting portion, and wherein the mechanism includes a forming frame projecting rearwardly of a coacting converging member, and which is operable to cause the stock material to be generally directed into the lateral pillow-like portions of the dunnage product rather than into the central connecting portion of the pad-like product, while providing for more securely connecting the pillow-like portions together along the central portion of the pad lengthwise thereof.

A still further object of the invention is to provide a mechanism of the latter described type which includes a converging member and coacting triangular shape, in plan, forming frame operative to urge the material of the sheet-like stock material laterally into the pillow-like portions of the pad-like product, and wherein the pillow-like portions of the pad-like product are more expeditiously secured to one another along a generally central connecting section of the product so that the pad-like product can be more expeditiously utilized in packing or cushioning of products.

A still further object of the invention is to provide a mechanism of the latter described type which includes a novel separating means for causing separation of the sheets of web-like material after they are emitted from the multi-ply stock roll, and prior to the web-like material entering into the converging member and the connecting sections of the mechanism.

A still further object of the invention is to provide a novel method for the production of pad-like dunnage product, and wherein the product is generally securely connected along a generally central coined portion thereof, thereby insuring lesser possibility of the pillow-like portions becoming inadvertently separated from one another during use of the product as packing.

A still further object of the invention is to provide a novel method of the latter mentioned type wherein the sheet-like stock material after its lateral edges are disposed in rolled form and passed through a geared connecting means which connects by coining the lateral pillow-like portions of the product together along the generally central section of the pad-like product, is thereafter pushed through a short length of guiding and restraining means preparatory to its being cut into selected lengths.

A still further object of the invention is to provide a novel alternate form of stock roll for use in the dunnage producing mechanism, and which includes a plurality of plies of sheet-like stock material with one of the plies being of a thicker gauge of material as compared to the other plies or webs of stock material.

Other objects and advantages of the invention will be apparent from the following description taken in conjunction with the accompanying drawings wherein:

BRIEF DESCRIPTION OF THE DRAWINGS

FIG. 1 is a broken, partially sectioned, top plan view of a dunnage producing mechanism embodying the invention, and illustrating the pad-like dunnage product being emitted therefrom;

FIG. 2 is a partially sectioned, side elevational view of the mechanism of FIG. 1;

FIG. 13 is an end view of the exit end of the converging member;

FIG. 14 is a top plan view of the guiding and restraining chute or tunnel of the dunnage producing mechanism that coacts with the connecting gear section of the mechanism and which is disposed generally immediately downstream from said connecting section;

FIG. 15 is a side elevational view of the guiding and restraining chute of FIG. 14;

FIG. 16 is an end elevational view of the guiding chute of FIGS. 14 and 15 taken from the entry end thereof, and illustrating in phantom lines the meshed gears of the connecting section;

DESCRIPTION OF PREFERRED EMBODIMENT AND ALTERNATE EMBODIMENT

Figure 3:
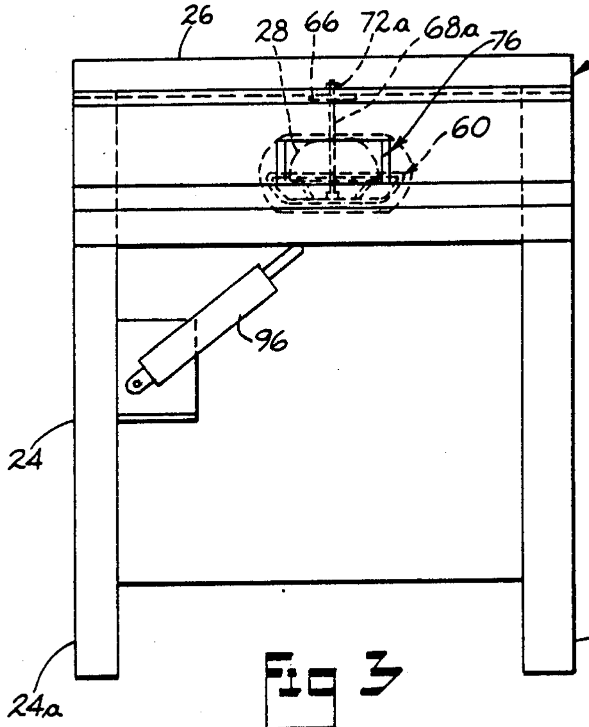
FIG. 3 is a partially broken, end elevational view of the mechanism of FIGS. 1 and 2 taken from the righthand or product exit end thereof.

Referring now again to the drawings, there is illustrated a dunnage producing machine 10 utilizing a single multi-ply stock roll 12 of sheet-like stock material, such as for instance, 30 pound kraft paper sheet. In the embodiment of stock roll illustrated in for instance FIGS. 1 through 4, the plies of the stock roll are preferably of equal width and, in the embodiment illustrated, comprise three plies disposed in roll form for expeditious installation on the dunnage producing mechanism.

Such stock roll 12 comprises in the embodiment illustrated, a hollow core 14 (FIG. 9) of generally cylindrical configuration on which the three superimposed webs or sheets of stock material are wound. The stock roll is adapted to be mounted on a supporting rod 16 extending relatively loosely through the core 14, for rotation of the stock roll 12 relative to the supporting framework structure 18, as the stock material is drawn from the roll into the dunnage machine 10.

Supporting framework 18 in the embodiment illustrated comprises laterally spaced brackets of generally U-shape in side elevation (FIG. 2) with the U being turned on its side, and with the lower leg 18a of the structure at each respective side of the machine comprising a recess 20 in which the ends of the roll supporting rod 16 are disposed. A pin 22 may be provided through one end or both ends of the rod 16 to limit or prevent rotation of the rod during rotation of the roll as the webs of sheet-like stock material are withdrawn therefrom. As an example, the elongated roll 12 of stock material mounted on the machine may be of a dimension of approximately 12 inches in diameter by approximately 28 to 30 inches in width, although it will be understood that other dimensions of stock roll can be utilized depending on the size of the supporting framework 18 and the size of the machine.

The machine 10, in the embodiment illustrated, comprises a frame 24 including leg portions 24a which may include adjustable means (not shown) associated therewith, for providing for leveling the machine with respect to the supporting surface S (FIG. 2). A hinged or removable cover 26 is preferably provided for obtaining ready access to the interior of the machine.

Figure 12:
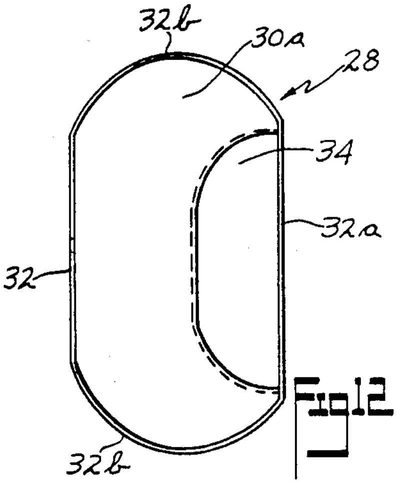
FIG. 12 is an end elevational view taken from the righthand or entrance end of the converging member of FIG. 11.

The frame 24 supports a longitudinally converging member 28 (FIGS. 1, 2, 11, 12 and 13) through which the superimposed sheets or webs of stock material are adapted to pass as they are drawn off the stock roll and are passed toward the connecting mechanism section 30 of the machine. As can be best seen in FIGS. 1, 2, 11, 12 and 13, the converging member comprises a widened generally oval shaped entrance mouth 30a (FIG. 12) formed or defined by generally flat top and bottom wall sections 32, 32a and arcuate side wall sections 32b of the converging member.

The top wall section 32 is of generally trapezoidal shape (FIG. 11) while the bottom wall is generally rectangular in shape and with such walls converging toward one another to define the exit end 34 (FIG. 13) of the converging member, such exit end being of generally semi-oval configuration in elevation (FIG. 13).

As the sheet-like stock material is passed through the converging member 28, the side edges of the stock are rolled inwardly into generally spiral form and are urged inwardly toward one another so that the inwardly rolled edges form resilient pillow-like portions of stock material disposed in lateral abutting relationship as they emerge from the exit end of the converging member, and are adapted to be joined together by the connecting mechanism 30. Converging member 28 may be formed of any suitable material, and may conveniently be formed of a suitable plastic material such as for instance fiberglas.

Figure 6:
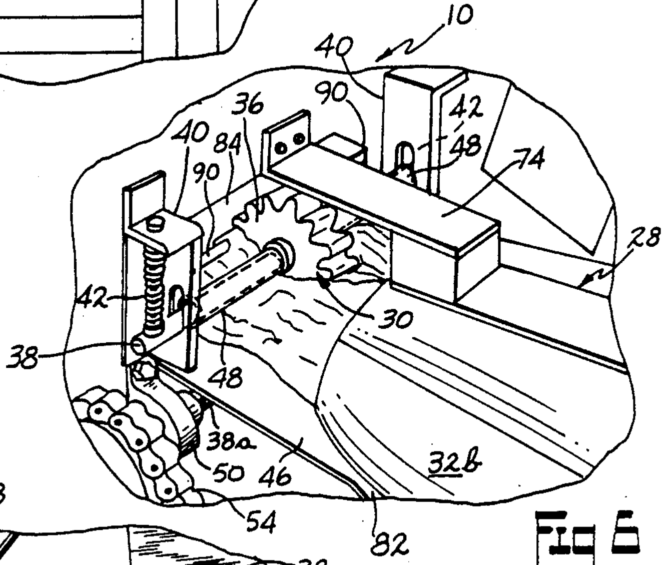
FIG. 6 is an enlarged, fragmentary, perspective illustration of the converging member and coacting meshed coining gear means for connecting the laterally arranged, generally abutting pillow-like portions of the dunnage product together, and illustrating the passage of the rolled edge stock material into the connecting section for coiningly connecting the central section of the pad-like product, prior to its passage through the guide tunnel section of the mechanism.
Figure 7:
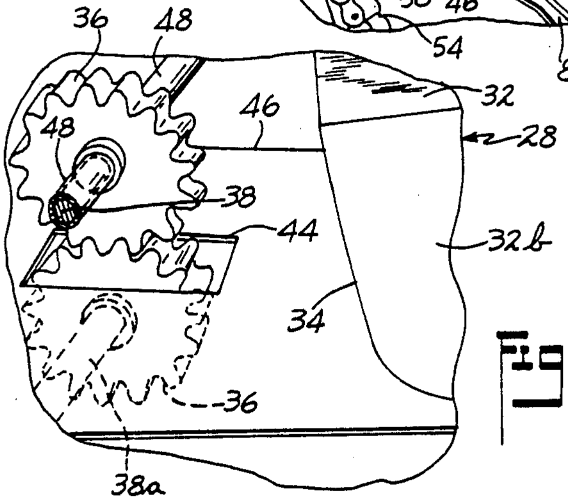
FIG. 7 is an enlarged fragmentary, perspective view of the meshed connecting gears of the connecting section disposed adjacent the exit end of the converging member of the mechanism, and illustrating coacting vertically oriented sleeve roller means on the shaft of the upper gear component for facilitating the flow of rolled edge sheet-like stock material into and past the connecting means and beneath the upper gear shaft as the produced dunnage product is being emitted from the mechanism.

The connecting means 30, in the embodiment illustrated, comprises generally loosely meshed, vertically arranged gears 36, 36a which are rotatably mounted as by means of a respective shaft 38, 38a. Shaft 38 of the upper gear 36 is preferably arranged with the ends of the shaft being mounted in slotted bracket frames 40 (FIG. 6) and with the ends of the shaft being spring loaded as at 42, for urging shaft 38 and associated gear 36 downwardly toward the underlying gear member 36a. It will be seen therefore that the top gear 36 which is rotatable relative to its supporting shaft 38, generally "floats" due to supporting slotted bracket structure 40 with gear 36 and associated shaft 38 being movable vertically relative to the underlying gear 36a, to thus provide for automatic varying of the space between the gear teeth in the event of varying amounts or thicknesses of the sheet-like stock material attempting to pass therebetween during the connecting operation. Such arrangement aids in preventing tearing of the stock material due to too hard "meshing" between the connecting gearing 36, 36a of the mechanism. As can be best seen in FIG. 7, the underlying gear 36a projects upwardly through a slot 44 in generally horizontal support plate 46 which extends between the converging member 28 and the product exit opening of the dunnage producing machine, and which will be hereinafter described in greater detail.

Shaft 38 is preferably provided with roller sleeves 48 (FIGS. 6 and 7) on both sides of the gear 36 so that as the crumpled rolled edge stock material emerges from the exit end 32 of the converging member 28, it passes beneath the shaft 38 and associated roller sleeves 48 which are rotatable relative to the shaft, and thus aid in preventing tearing of the pad-like product as the connecting gearing means 30 coins the generally central portion of the strip of product, and connects the lateral pillow-like sections thereof together, as illustrated for instance in FIG. 1, prior to emergence of the finished product from the machine.

Figure 5:
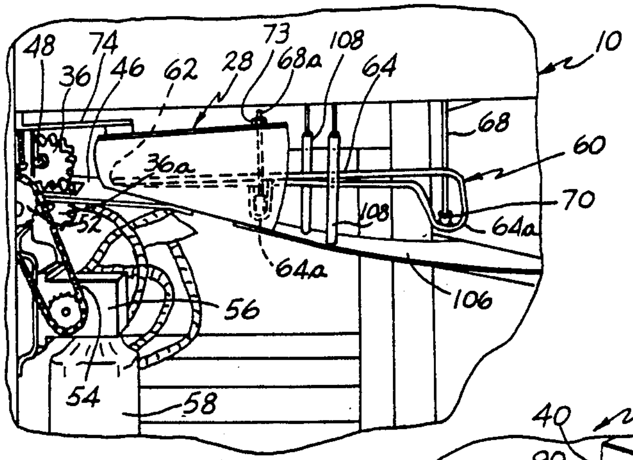
FIG. 5 is a fragmentary, broken illustration of the converging member and coacting forming frame of the mechanism, illustrating the preferred relationship between the nose of the forming frame and the exit end of the converging member, and of the latter with the connecting coining gear apparatus of the mechanism.

The underlying connector gear 36a is keyed or fixed to its shaft 38a, the latter being rotatably mounted at its ends in bearing structure 50, and may include a sprocket 52 secured adjacent one end of shaft 38a, and which sprocket 52 in turn is connected as by an endless chain or belt 54 to a geared speed reducer 56, the latter being driven by preferably an electric motor 58 mounted on the machine frame 24 (FIG. 5).

A forming frame 60 coacts with converging member 28 and projects rearwardly of the entry end 30a of the converging member. Frame 60 at its forward nose end 62 (FIGS. 1 and 2) extends into the converging member 28 with the nose of the forming frame being preferably disposed relatively close to the underlying bottom wall 32 of the converging member adjacent the exit end of the converging member, and as best illustrated in FIGS. 1, 2 and 5. The spacing between the forming frame nose end 62 and the underlying surface of the exit end of the converging member 28, and the "bite" of the connecting gearing is such that the nose end 62 projects into the path of travel of the stock material as it exits from the converging member and maintains the stock material in downward position adjacent the exit end of the converging member and prior to movement of the stock material into the connecting gears.

The forming frame comprises a V-like, in plan, body 64 and generally U-shaped, in end elevation, ribs 64a, extending downwardly from and generally transverse of said body portion 64, with each of said ribs being of substantially the same height, as best illustrated in FIG. 2. The rearmost rib may be formed integrally with the body 64 of the forming frame while the forward rib 64a of the forming frame may be secured as for instance by welds 65, to the body 64. Body 64 and associated transverse ribs 64a are preferably of rounded or arcuate configuration in transverse cross-section to facilitate the sliding movement of the sheet-like stock material relative to the forming frame 60 as it (the webs of stock material) pass from the stock roll 12 past the forming frame and through the converging member, and into the connecting means 30.

As can be seen in FIG. 1, the forming frame 60 may be supported in depending relationship from generally horizontal strap 66 which is attached by any suitable means to the support frame 24 of the machine. Hangers 68, 68a depending from the strap 66 may be secured as by means of threaded ends to complementary threaded sockets 70 (FIG. 2) secured to each respective rib 64a of the forming frame. The length of the hangers may be adjusted with respect to the support strap by means of threaded portion 72 and coacting nuts 72a, so that the position of the forming frame 60 relative to the other operating components of the machine, including the converging member 28, can be selectively varied. However, the preferred orientation of the forming frame relative to the converging member is the general horizontal orientation illustrated in FIG. 2, wherein the body 64 of the forming frame is disposed in a substantially longitudinally extending horizontal plane. Adjustable threaded nut 73 coacting with the forwardmost hanger 68a which passes through an opening 73a in the top wall of the converging member 28, supports the entry end of the converging member on the coacting hanger and positions the converging member with respect thereto. The forward end of the converging member may be supported by bracket 74.

Figure 18:
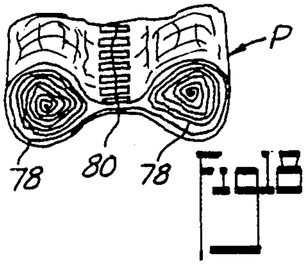
FIG. 18 is a fragmentary generally diagrammatic, end perspective illustration of the pad-like dunnage product produced on the instant dunnage producing mechanism.
Figure 4:
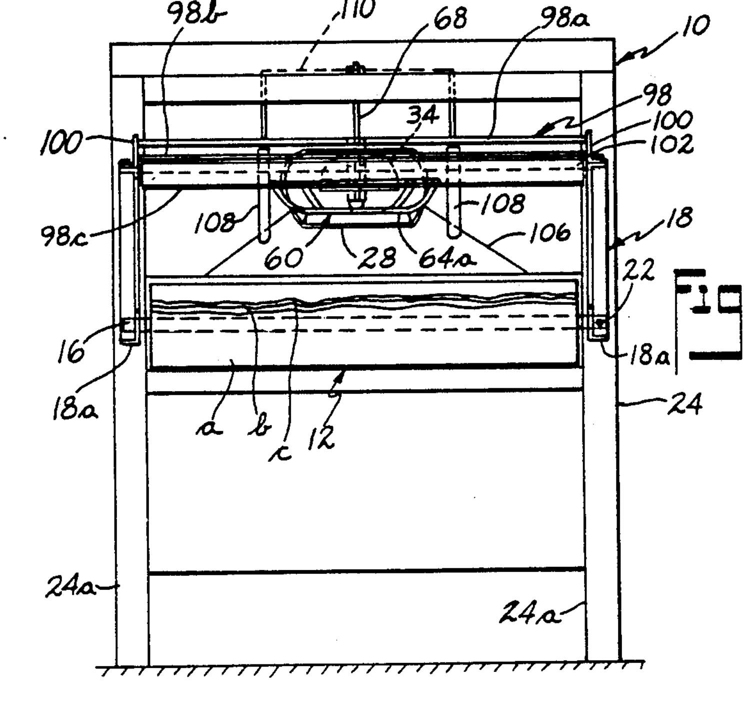
FIG. 4 is an end elevational view of the mechanism of FIGS. 1 through 3 taken from the lefthand or stock material entry end thereof.

Disposed downstream from the connecting means 30 is a product guiding and lateral restricting means 76, which in the embodiment illustrated comprises a generally rectangular-shaped sleeve or tunnel-like member through which the pad-like or pad-shaped product passes as it is emitted from the connecting means 30. The guiding means encompasses and directs the pad-like or pad-shaped product P (FIG. 1) prior to its being emitted from the discharge opening of the dunnage machine with the product comprising lateral resilient pillow-like or pillow-shaped portions 78 (FIGS. 1 and 18) connected together by the generally central coined section 80 of the product, extending lengthwise thereof.

Guide member 76 in the embodiment illustrated is of fabricated construction, and may be formed of any suitable material, such as for instance, fiberglas, plastic, or sheet metal, with the aforementioned support plate 46 forming the bottom defining surface of the guide member. Support plate 46 is directed downwardly at its distal end, and as at 82 (FIGS. 14 and 15) for general surface-to-surface coaction with the exterior of the bottom wall 32a of the converging member. Wall 32a and plate portion 46 may be secured to one another by any suitable means, such as for instance, by riveting or by adhesive means.

The tunnel section 84 of the guide member is as aforementioned of generally rectangular configuration and is of a substantially greater width as compared to its height. The aforementioned slot 44 is disposed or oriented so as to extend forwardly from the tunnel section 84, with the top wall 86 of the tunnel section being slotted as at 88, for providing predetermined clearance for rotation of the upper coining gear 36 which extends upwardly beyond the top wall 86 of the tunnel section. As best shown in FIGS. 15 and 16, the forward defining surface of the upper wall of the tunnel section 86 is bent or directed upwardly to provide guide flanges 90 disposed on opposite sides of slot 88 and adapted to aid in ensuring that the pad-like product will readily slip past the upper defining wall of the tunnel section 84 as the produced pad-like product passes therethrough to be emitted from the machine.

Ear portions 92 may be provided on the guide member 76 for securing the guide member to the framework 24 of the machine at the exit opening through the rear wall thereof.

Rearwardly of the tunnel section 84, the top of the guide member is open as at 94, and as can be best seen in FIGS. 14 and 15. However, the side walls 84a and the bottom wall 46 defining the forward tunnel section extend rearwardly and continue to provide guiding and retaining surfaces for the pad-like product as it passes through the guide member 76 and to the cutter means 96 (FIGS. 2 and 3) provided on the machine, for selectively cutting the pad-like product into desired lengths. Reference may be had to aforementioned U.S. Pat. No. 4,026,198 which is incorporated herein by reference, for a more complete disclosure of a cutter mechanism for cutting the pad-like product into selected lengths. It will be understood that the guide means 76 provides for guiding and stabilizing of the pad-like product as it is being emitted from the machine into the cutter section, so that more effective cutting of the resilient pad product can be accomplished.

With the machine arrangement illustrated, the orientation of the nose of the forming frame 60 with respect to the bottom wall of the converging member 28 at the exit end of the latter ensures that the sheet-like stock material is urged laterally outwardly into the pillow-like sections 78 of the formed pad-like product, and is not disposed in the central coined section thereof, thus tending to increase the resiliency of the pad-like product, and providing for somewhat lesser density of the pad-like product per unit volume. In this connection, the density of the produced product is approximately 0.6 to 0.7 pounds per cubic foot in the uncompressed condition of the product when utilizing 30 pound kraft paper.

As can be seen from FIGS. 1 and 2, the guide tunnel section 84 of the guide member 76 is of a relatively short length ad is disposed closely adjacent to the connecting means 30 commencing generally at the connecting means and extending downstream therefrom. The spacing between the interiors of the side wall sections 84a of the tunnel section 84 is preferably slightly more than the length of the spacing Z (FIG. 13) at the exit end of the converging member while the distance T (FIG. 16) between the top and bottom walls of the tunnel section 84 is preferably the same as or just slightly less than the length of the dimension Y at the exit end of the converging member 8. Accordingly, the pad-like product as it passes through the tunnel section 84 is generally constrained circumferentially thereof for the relatively short length of the tunnel section, and thereafter, the pad-like product and particularly the pillow-like sections 78 thereof can expand at open top section 94 due to their inherent resiliency, as the pad-like product is emitted from the machine past the cutter means 96. Upon emission from the tunnel-like section 4, it will be seen that pad-like product is still restrained laterally by the rearward extensions of side wall sections 84a, but is unrestricted for upward expansion, thus tending to encourage the "fluffing up" of the pillow-like sections 78, due to the natural "memory" of the rolled and crumpled paper or other stock material forming the pillow-like sections.

The cutter mechanism 96 which may be of conventional known type and which may be actuated as for instance by means of a reciprocal hydraulic motor unit, may be utilized for selectively slicing or cutting the emitted pad-like product into selected lengths. Such cutter mechanism may be operated manually as by means of a finger control button (not shown) on the machine, or by means of a foot pedal at the product exit end of the machine, and under the control of a workman operator.

Referring now in particular to FIGS. 1, 2, 4, 8 and 9, there is provided at the forward end of the machine, a separating mechanism 98 which is adapted to receive the sheet-like stock material from the stock roll 12 and to separate the multi-plies of the roll into individual plies or webs of stock material prior to their passing beneath the forming frame 60 and into the converging member 28, thus aiding in maintaining the resiliency of the produced dunnage product. Separating means 98 in the embodiment illustrated comprises a plurality, and in the embodiment illustrated three, vertically spaced generally horizontally oriented cylindrical bar-like elements 98*a*, 98*b* and 98*c* about which is adapted to pass the respective web a, b and c of the stock material from the rotatable stock roll, prior to passage thereof past the forming frame and into converging member 28.

Figure 8:
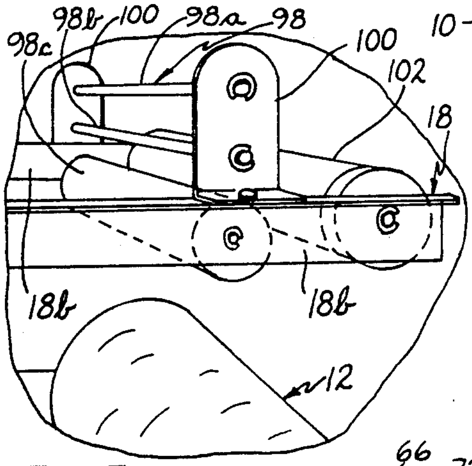
FIG. 8 is an enlarged fragmentary, perspective illustration of the separating section of the dunnage producing mechanism, and also illustrating a transverse roller member disposed upstream from the separating apparatus, which provides for the commencement of entry of the sheet-like stock material toward the separating section at a constant point irrespective of the diameter of the associated stock roll.
Figure 9:
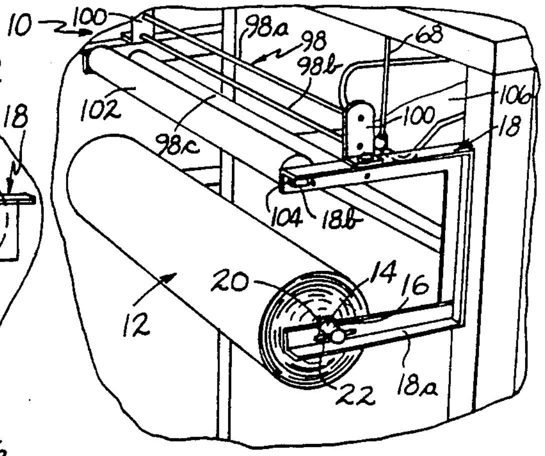
FIG. 9 is a fragmentary, perspective reduced size illustration of the separating section and constant entry roller of FIG. 8 taken from the opposite side thereof as compared to FIG. 8.
Figure 10:
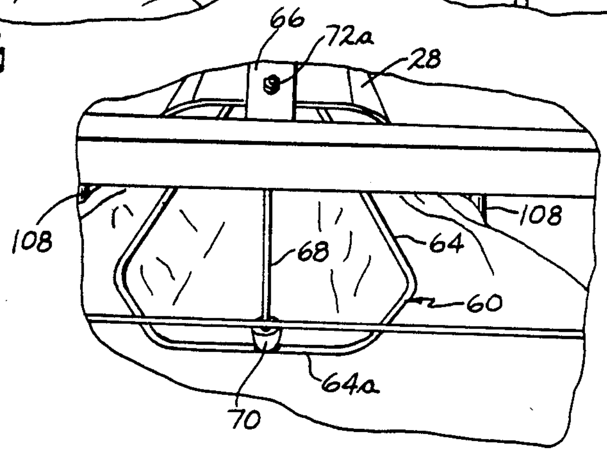
FIG. 10 is a fragmentary, perspective illustration of the dunnage producing mechanism taken from the stock entry end of the mechanism and illustrating the forming frame and converging member and the sliding movement of the sheet-like stock material from the separating section past the forming frame and into the converging member.
Figure 11:
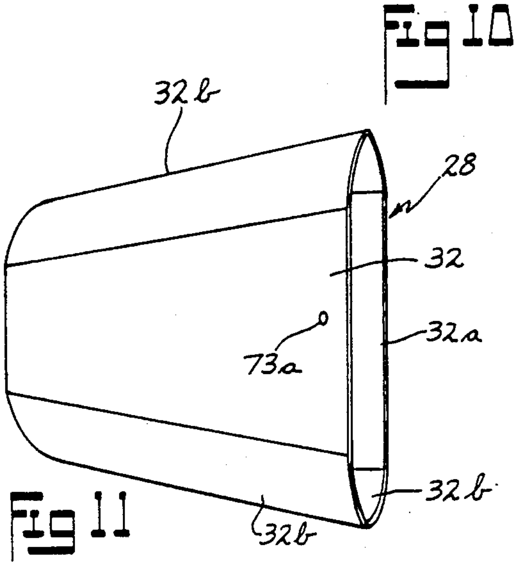
FIG. 11 is an enlarged generally top plan view of the converging member per se.

As can be best seen in FIGS. 8 and 9, the lower transverse bar-like member 98*c* is of a materially greater thickness or diameter as compared to those of the upper bar-like members 98*a* and 98*b*, with member 98*c* preferably being rotatably mounted on the upper arm 18*b* of the respective support bracket 18. Member 98*c* can be directly supported on the arms 18*b* while L-bracket members 100 are utilized for supporting preferably rotatable barlike members 98*a* and 98*b* above the level of the support bracket 18. The arrangement of the webs a, b and c with respect to the separating bars 98*a*, 98*b* and 98*c* are preferably as shown in FIG. 2. Webs b and c both may engage roller 98*c* while web a passes over rotatable bar 98*b* as shown in FIG. 2. The rotatable mounting of elements 98*a*, 98*b* and 98*c* aids in preventing tearing of the stock material in its passage through the machine.

Disposed outwardly from separating mechanism 98 and also supported on upper arm 18*b* is a further bar member 102 which in the embodiment illustrated is a rotatable roller having a cylindrical exterior surface, with the ends of roller rotatably mounted directly on the spaced upper arms 18*b* of U-brackets 18. Roller member 102 provides a non-varying point of entry of the plies of sheet-like stock material from the stock roll 12, as they are pulled into the dunnage producing mechanism toward said separating means, and irrespective of the diameter of the stock roll. Thus in the event of utilizing a larger diameter roll or as the stock roll is used up during operation of the mechanism, the point of entry of the material toward the separating means remains constant, thus facilitating the more uniform production of dunnage pad product from the mechanism. Roller 102 may be provided with a manually adjustable braking mechanism diagrammatically illustrated at 104 (FIG. 2) and coacting with an end of the roller shaft, for selectively applying tension on the roller against free rotation thereof, thereby providing means for varying the frictional contact between the plies of sheet-like stock material and the roller member 102 as the plies or webs of stock material pass over the roller 102 toward the separating means 98.

Referring now in particular to FIGS. 1, 2, 3 and 5, the machine is preferably provided with generally upwardly sloping stock loading plate or panel 106 (FIGS. 2, 4 and 5) which preferably extends between the rear end of the machine and the converging member 28, and which is adapted to facilitate initially moving the webs of paper stock from the supply roll 12, beneath the forming frame 60, into and through the converging member and thence into contact with the connecting gear mechanism 30, preparatory to starting the motor 58 for initiating pulling of the stock material from the stock roll into the machine. Member 106 may be formed of any suitable material such as sheet metal or plastic and materially speeds up the initial setting up of the machine for production of the resilient pad product thereof. It will be seen that the machine is initially set up for producing product by inserting stock material from the roll through the converging member where it is grabbed by the meshed rotating gears 36, 36*a*.

To facilitate the smooth entry of the webs of stock material from the stock roll into the entry end of the converging member 28, the machine is preferably provided with spaced, generally vertically extending rollers 108 (FIGS. 2, 3 and 5) rotatably mounted on wire frame 110 which is connected as at 112 to strap 66. Rollers 108 aid in the smooth and uniform inward rolling and the guiding of the lateral edges of the sheet-like stock material as it passes into the converging member 28, and formation of the stock into the pad-like dunnage product. Rollers 108 also help to ensure that the stock material doesn't become snagged on the entrance end of the converging member during its movement therethrough.

Figure 17:
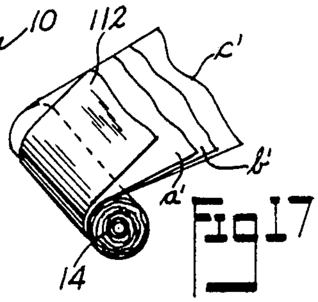
FIG. 17 is a perspective, reduced size illustration of another embodiment of stock roll, utilizing a lesser width on one of the plies or webs of the roll but of a thicker gauge as compared to the other of the plies or webs.

Referring now to FIG. 17, there is disclosed another or alternate embodiment of stock roll as compared to that illustrated in FIGS. 1 through 9. In the FIG. 17 embodiment of stock roll, the roll is comprised of a plurality of plies or webs a', b' and c' of generally the same width similarly to that of the first described embodiment of stock roll but wherein additionally there is provided a further web 112 which is of a lesser width as compared to the width of webs a', b' and c'. For instance for a 30 inch width of stock roll, the web 112 may be for instance 26 inches in width, thus leaving a narrow border of two inches on either side thereof as compared to the width of the adjacent webs of sheet-like stock material. Also the web 112 is preferably of a heavier gauge of material as compared to that of each of the webs a', b' and c'. For instance when the stock material is kraft paper, or combinations of kraft paper and other stock materials (e.g. film or foil) 50 pound kraft paper may be utilized for the web 112 while for the webs a', b' and c' 30 pound kraft paper or some other suitable sheet-like stock material may be utilized.

The end result of such an alternate embodiment of stock roll is that when the lateral edges of the webs of sheet-like stock material are turned or rolled inwardly and the central section of the produced product is coined by the gears of the connecting mechanism 30, the lateral edges of the lesser width web 112 will generally not be coined by the gears of the connector. Instead they will terminate interiorly of the pillow-like or pillow-shaped portions while the rolled edges of the other plies or webs of stock material will be joined as at 80 by the crimping gears of the connecting mechanism. Such arrangement aids in the provision of somewhat greater resiliency or resistance to compression in the pillow-like or pillow-shaped portions of the produced pad-like product due to the heavier nature and arrangement of the material of web 112 without adding to the stock material compressed at 80 in the produced dunnage product.

From the foregoing description and accompanying drawings it will be seen that the invention provides a novel converter mechanism and associated method for producing relative low density pad-like cushioning dunnage product from sheet-like stock material, such as for instance paper, and wherein the mechanism includes a novel arrangement of forming frame and associated converging member for causing inward rolling of the lateral edges of the sheet-like stock material into generally rolled form, after which the rolled edge stock material is passed through a connector means where the abutting pillow-like portions are connected together and hold the produced product in its pad-like form.

The invention also provides a novel arrangement of ply or web separator mechanism for the converter and a novel arrangement of guiding section downstream from the connector mechanism, for maintaining the produced pad-like dunnage product in contained stabilized form preparatory to severing of the same by means of associated cutting mechanism.

The invention also provides a novel method for the production of pad-like dunnage product, and a machine that is of relatively accessible construction for facilitating its use and maintenance in the production of the pad-like packing product, together with a novel form of alternate stock roll for the machine.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

We claim:

1. A stock roll of paper adapted for use with a dunnage producing converter mechanism for supplying paper stock material to the mechanism, so as to be converted into a pad-shaped, dunnage product of lateral resilient pillow-shaped portions connected by a generally central connecting section running lengthwise of the product, said stock roll comprising a multi-ply roll of paper webs wound about the lengthwise axis of the roll, with one web of said roll being of a lesser width but thicker gauge as compared to the width and gauge of other webs of said roll.

2. A stock roll in accordance with claim 1 wherein said one web consists of 50 pound kraft paper while the remainder of the webs each consist of 30 pound kraft paper.

3. A stock roll adapted for use with a dunnage producing converter mechanism for supplying stock material to the mechanism, so as to be converted into a pad-shaped dunnage product of lateral resilient pillow-shaped portions connected by a generally central connecting section running lengthwise of the product, said stock roll comprising a multi-ply roll of continuous individual webs wound in superimposed relation about the lengthwise axis of the roll with at least one of said webs being of a thicker gauge and lesser width as compared to the width and gauge of the other webs of said roll, said one web being the outermost web as wound on said roll.

4. A stock roll in accordance with claim 3 wherein said one web is 50 pound kraft paper while the remainder of the webs each consist of 30 pound kraft paper.

5. A stock roll in accordance with claim 3 wherein the roll consists of four webs, the outermost of said four webs being said one web.

* * * * *